United States Patent [19]

Rogers

[11] 3,921,736
[45] Nov. 25, 1975

[54] MOTION DETECTOR FOR A WEIGHING SCALE
[75] Inventor: Robert M. Rogers, Troy, Ohio
[73] Assignee: Hobart Corporation, Troy, Ohio
[22] Filed: Apr. 29, 1974
[21] Appl. No.: 464,766

[52] U.S. Cl. .............. 177/1; 177/210; 177/DIG. 3
[51] Int. Cl.² ............................................. G01G 3/14
[58] Field of Search ...... 177/1, 210, DIG. 3, DIG. 8

[56] References Cited
UNITED STATES PATENTS

| | | | |
|---|---|---|---|
| 3,276,526 | 10/1966 | Loshbough | 177/3 |
| 3,447,617 | 6/1969 | Susor et al. | 177/3 |
| 3,453,422 | 7/1969 | Susor | 177/3 X |
| 3,516,504 | 6/1970 | Allen | 177/12 |
| 3,557,353 | 1/1971 | Allen et al. | 177/3 X |
| 3,698,493 | 10/1972 | Yamanaka et al. | 177/3 |
| 3,770,069 | 11/1973 | Loshbough | 177/1 |
| 3,789,937 | 2/1974 | Strobel | 177/DIG. 3 |

Primary Examiner—George H. Miller, Jr.
Attorney, Agent, or Firm—Biebel, French & Bugg

[57] ABSTRACT

A method of detecting motion of a weighing scale platform including the steps of periodically generating electric signals representing weight, transferring said weight signals to a memory, comparing said incoming weight signals with that previously stored in the memory prior to transfer of new weight signals, thereinto and generating a motion signal whenever there are more than a predetermined number of successive weight changes in the same direction.

An apparatus for detecting motion of a weighing scale platform including means for periodically generating electrical signals representing weight on the platform and means for temporarily storing these weight signals in a shift register. The weight information is then transferred to a memory/display device. A comparator device connected between the shift register and the memory provides either a greater than, or less than output, and the output of this device is stored in a direction sensor. A motion sensor is connected to both the comparator and the direction sensor and provides an output whenever there are two successive weight changes in the same direction, i.e., when the comparator output and the direction sensor output are the same. The output of the motion sensor is connected to a retriggerable multivibrator which provides a motion signal of predetermined time duration.

10 Claims, 7 Drawing Figures

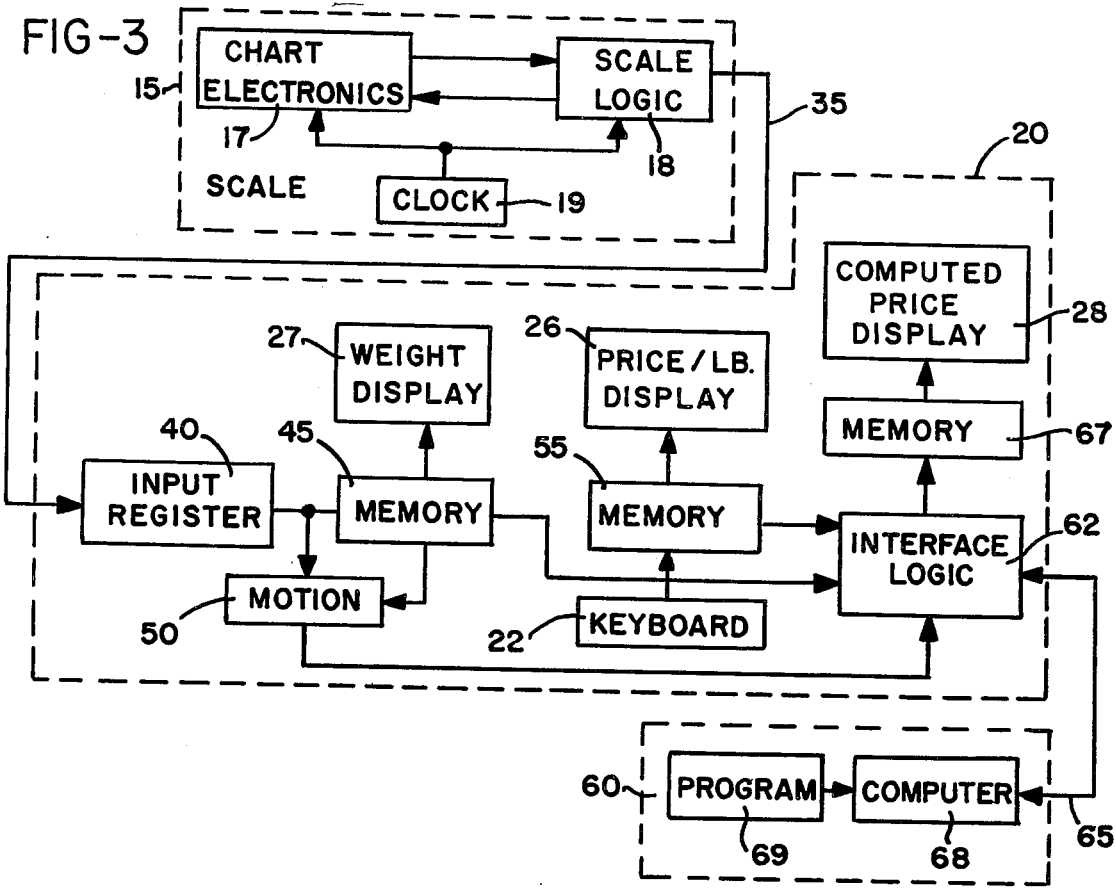
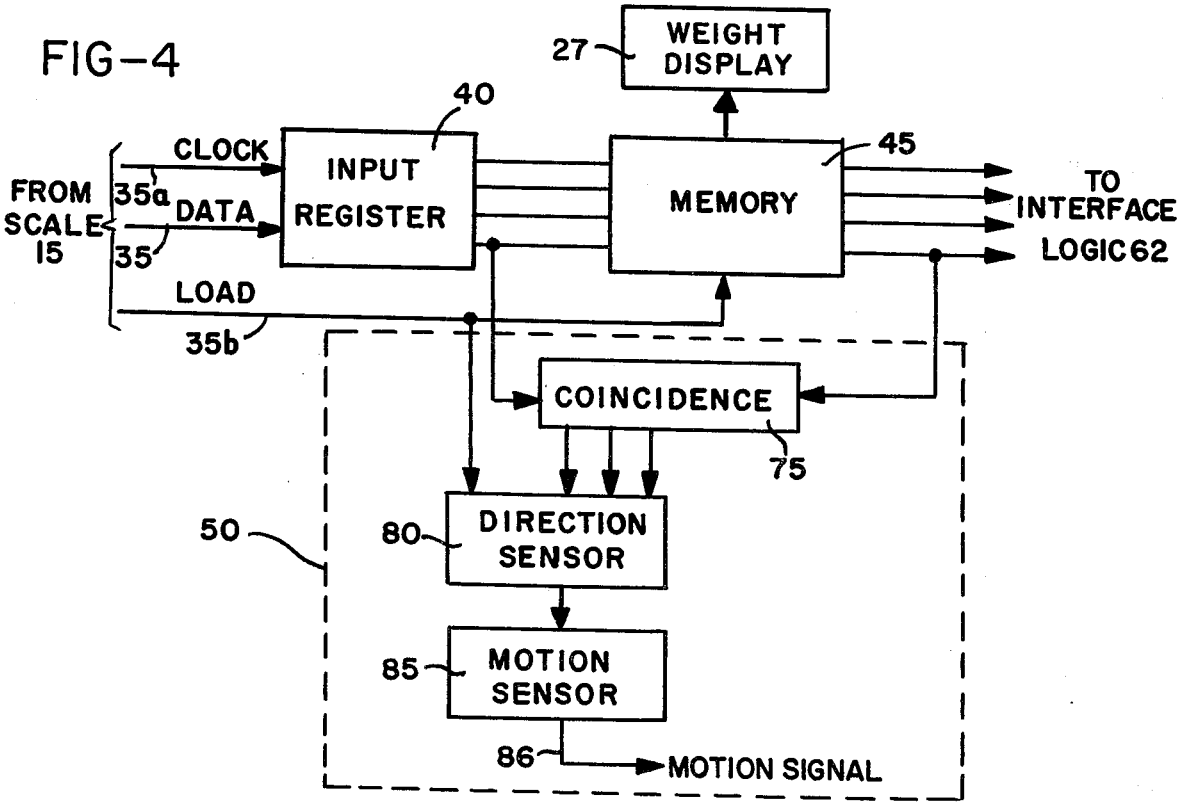

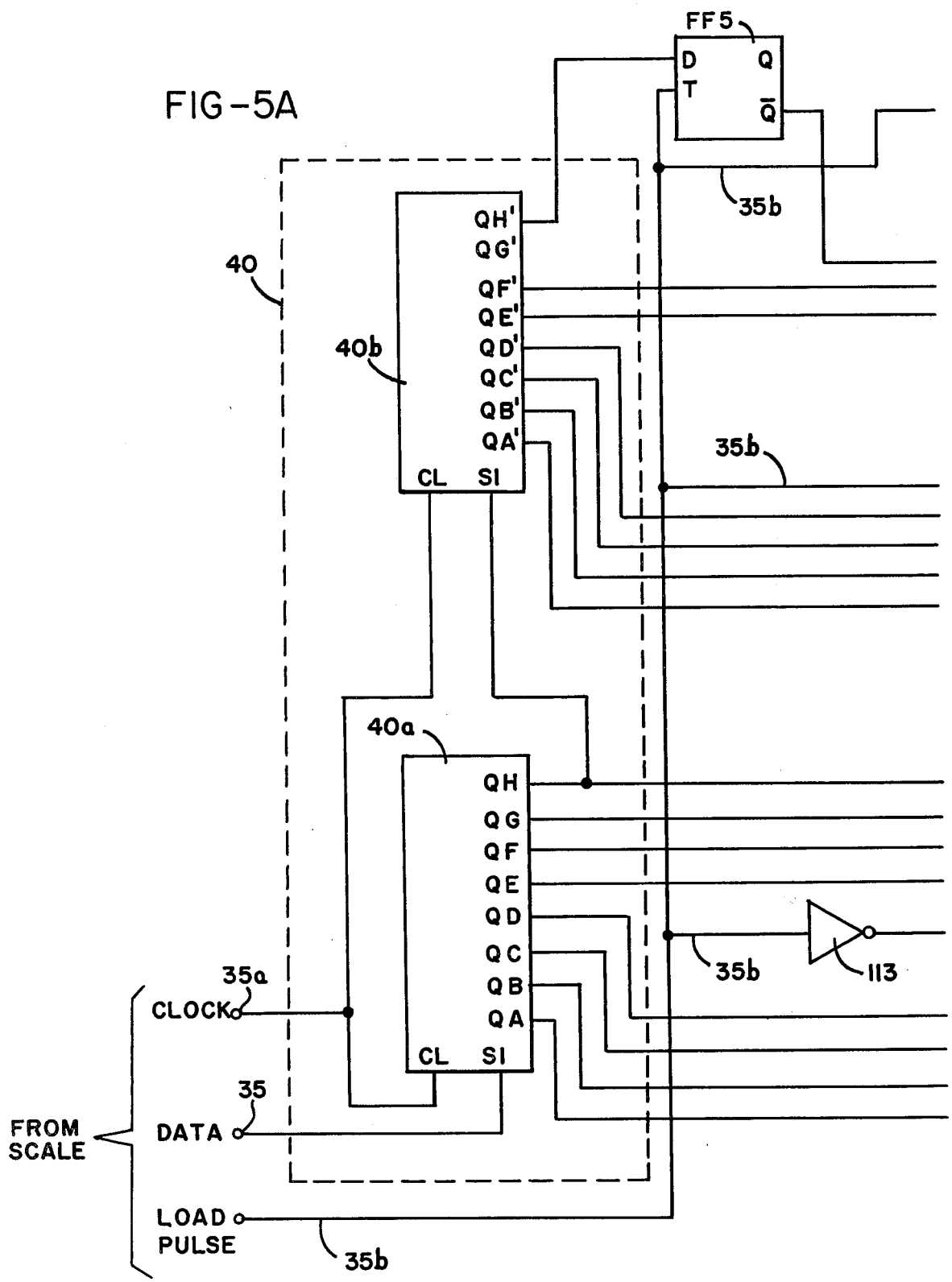

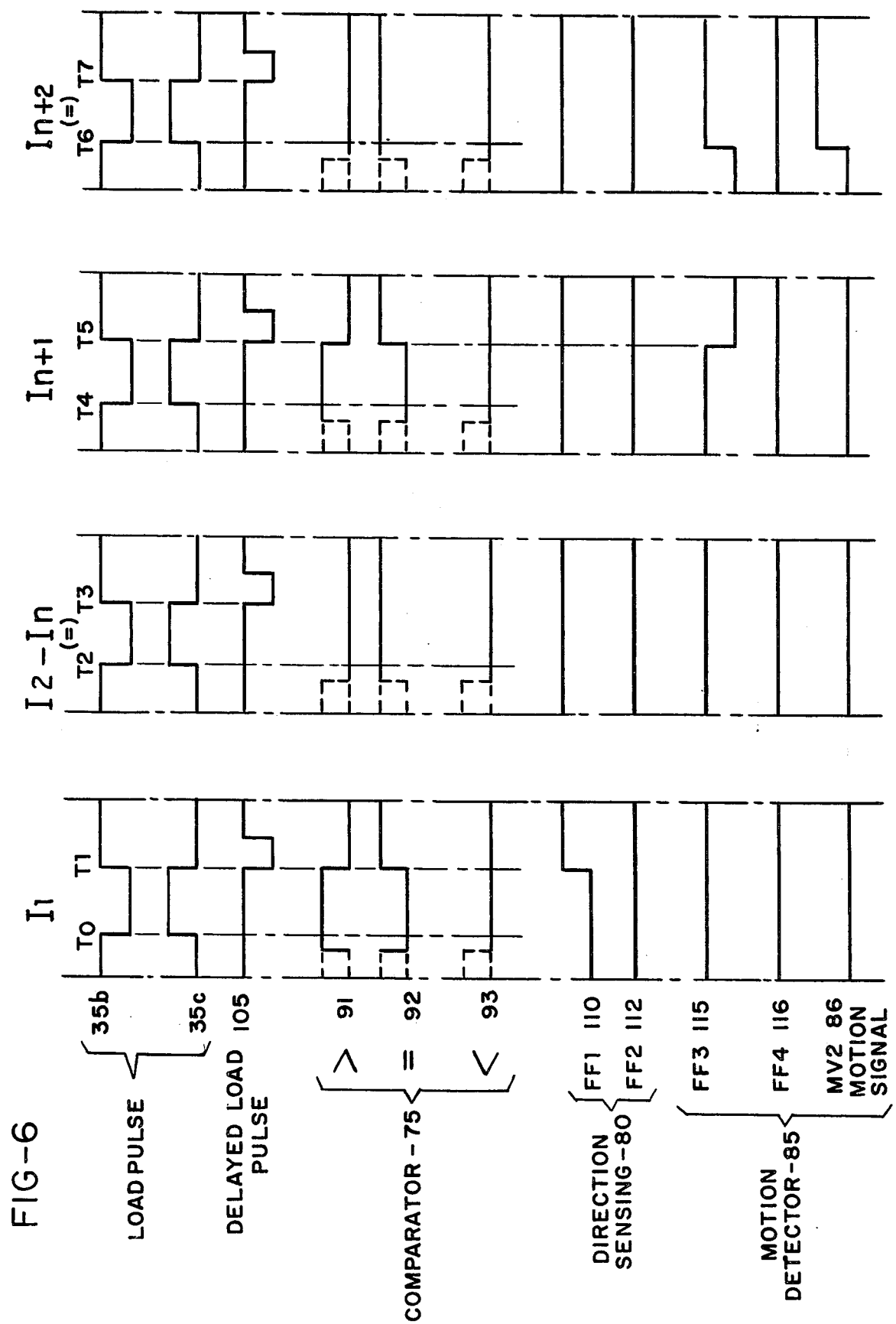

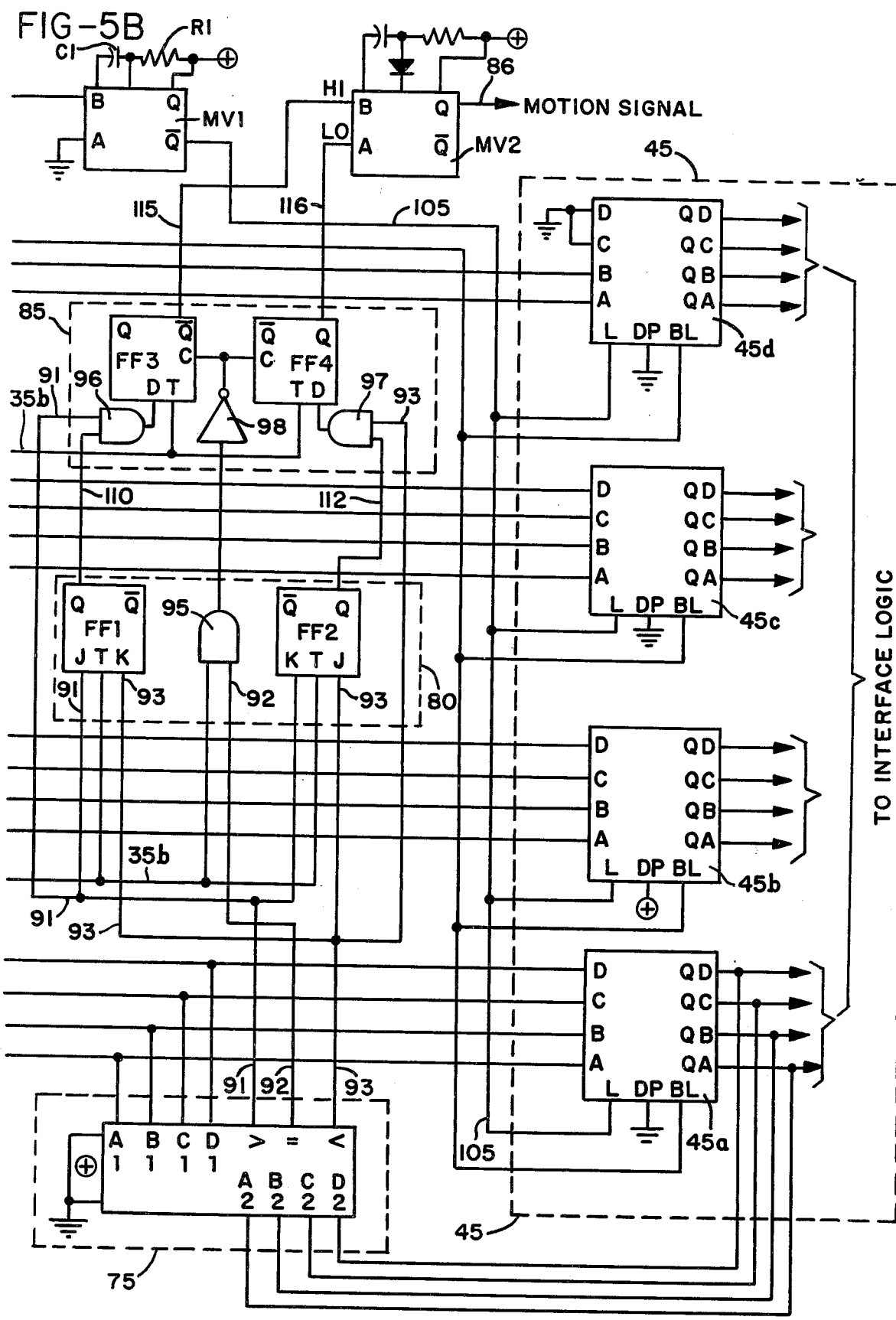

MOTION DETECTOR FOR A WEIGHING SCALE

CROSS REFERENCE TO RELATED APPLICATIONS

This application is related to U.S. patent application, Ser. No. 464,767, filed Apr. 29, 1974 date and assigned to the assignee hereof.

BACKGROUND OF THE INVENTION

This invention relates to an improved motion detector for use with weighing scales.

There are several types of motion detectors presently in use. U.S. Pat. Nos. 3,516,504 and 3,557,353 disclose a weighing scale wherein a coded chart is moved in accordance with the weight placed on the scale platter. The chart has a plurality of markings thereon arranged in several columns, and a photodetector is associated with each column. The outputs of the plate detector provide an electrical signal representing weight.

Motion of the coded chart is detected by sensing the output of two photodetectors which are observing markings which do not mutually coincide. Thus, if the scale is at rest, either one, but not both of the photodetectors will be energized. During scale motion, however, the effect will be that both photodetectors will be energized due to their response characteristics.

In U.S. Pat. No. 3,698,493, an electric indicator of scale weight is prevented from fluctuating rapidly by a type of motion detector. Scale motion is detected by observing a difference in a number stored in a memory and a number from a code generator associated with an optical chart moved by a scale platform. A comparator circuit is connected to both the code generator and the memory and provides an output only when a condition of non-coincidence exists. The comparator output is connected to a timer which operates a gate connected between the code generator and the memory and opens this gate only when a condition of noncoincidence exists for a predetermined period of time. If coincidence is detected within that period of time, the timer is reset and the gate remains closed so that the number in the memory is not changed and the indication of weight remains constant.

U.S. Pat. No. 3,701,106 discloses a motion detector wherein a weight number is periodically sent to and stored in a primary storage means and this number is subsequently transferred to a secondary storage means when it is determined that the input data is changing or has changed by more than a predetermined, adjustable amount. The input weight in the primary storage means is evaluated with respect to the number in the secondary storage means, and if the new weight information falls within a tolerance band, no transfer from the primary to the secondary storage means is made, and a coincidence signal is generated and sent to a counter. When the counter has received a predetermined number of coincidence signals, a "no motion" signal is generated. If motion is detected, the counter is reset to zero, and the new weight information is transferred from the primary storage means to the secondary storage means.

SUMMARY OF THE INVENTION

This invention relates to an improved method and apparatus for detecting motion of an electronic weighing scale platform.

In the preferred embodiment of the invention, a weighing scale includes means for periodically generating electrical signals representing weight of an object placed on the scale platform. This weight information may be transferred in either parallel or serial form to a computing device along with price per unit weight information from a keyboard as entered by a clerk. The weight of the object, the price per unit weight, and the computed value may be displayed on electro-optic display devices for viewing by both the clerk and customer. For a more detailed description of a computing scale system in which this invention may be used, reference is made to copending U.S. patent application, Ser. No. 464,767, filed on even date herewith.

The electronic signals representing weight in the system described in the above mentioned copending application are in binary code decimal (BCD) form sent in serial form and have associated therewith clock pulses and a load pulse. The weight signals are received in a temporary storage means or shift register, and upon receipt of the load signal, this weight information is transferred in parallel form to a memory device. An electro-optical display is associated with the memory device so that both the customer and the clerk may observe the weight.

Immediately prior to the transfer of weight information from the temporary storage means to the memory, a comparison of the weight values is made by comparison means and an electrical signal is generated representing one of three conditions: an increase in weight (greater than), no change in weight (equal to), or a decrease in weight (less than).

A direction sensing circuit is connected to the output of the comparison means to remember the direction of the weight change signals, either increasing or decreasing. This circuit is essentially an up-down counter.

A motion sensing circuit is connected to both the direction sensing circuit and the comparison means to provide an output whenever there are more than two successive weight changes in the same direction.

In the present invention, the repetition rate of the weight signals from the scale is such that the comparator device will indicate several equal to outputs even though the scale platform is moving downwardly. For example, in the present invention, a "greater than" output followed by several "equal to" outputs and then by another "greater than" output will result in a motion signal being generated. Similarly, two successive "less than" outputs will also result in a motion signal being generated even though these outputs are separated by several "equal to" outputs.

A retriggerable multivibrator is triggered by the output of the motion sensing circuit to provide a motion signal of predetermined duration. This multivibrator is retriggered each time the motion sensing circuit provides an output. Therefore the motion signal will be present until the scale platform comes to rest.

Oscillation of the scale platform about the balance position will generally not cause a motion signal to be generated since successive weight changes will usually be in opposite directions.

Accordingly, it is an object of this invention to provide an improved method of detecting motion of a weighing scale platform wherein electrical signals representing weight are generated periodically, transferred to a memory, the incoming weight signals are then compared with the previously stroed weight signals, and a motion signal is generated whenever more than a predetermined number of successive weight changes in the same direction occur.

It is another object of this invention to provide an improved apparatus for detecting motion of a weighing scale including means for periodically generating electrical signals representing weight, means responsive to said weight signals for generating signals representing the direction of weight change, and means for generating a motion signal when the number of successive weight change signals in the same direction exceed a predetermined number.

These and other objects and advantages of the invention will be apparent from the following description, the accompanying drawings and the appended claims.

BRIEF DESCRIPTION OF THE DRAWINGS

FIG. 3 is an electrical block diagram of a computing scale system;

FIG. 4 is a block diagram of a motion detector constructed in accordance with this invention; and FIGS. 5A and 5B together form an electrical schematic diagram of a motion detecting system constructed according to the teachings of this invention;

FIG. 6 presents in graphic form several time intervals.

DESCRIPTION OF THE PREFERRED EMBODIMENT

Figure 1:
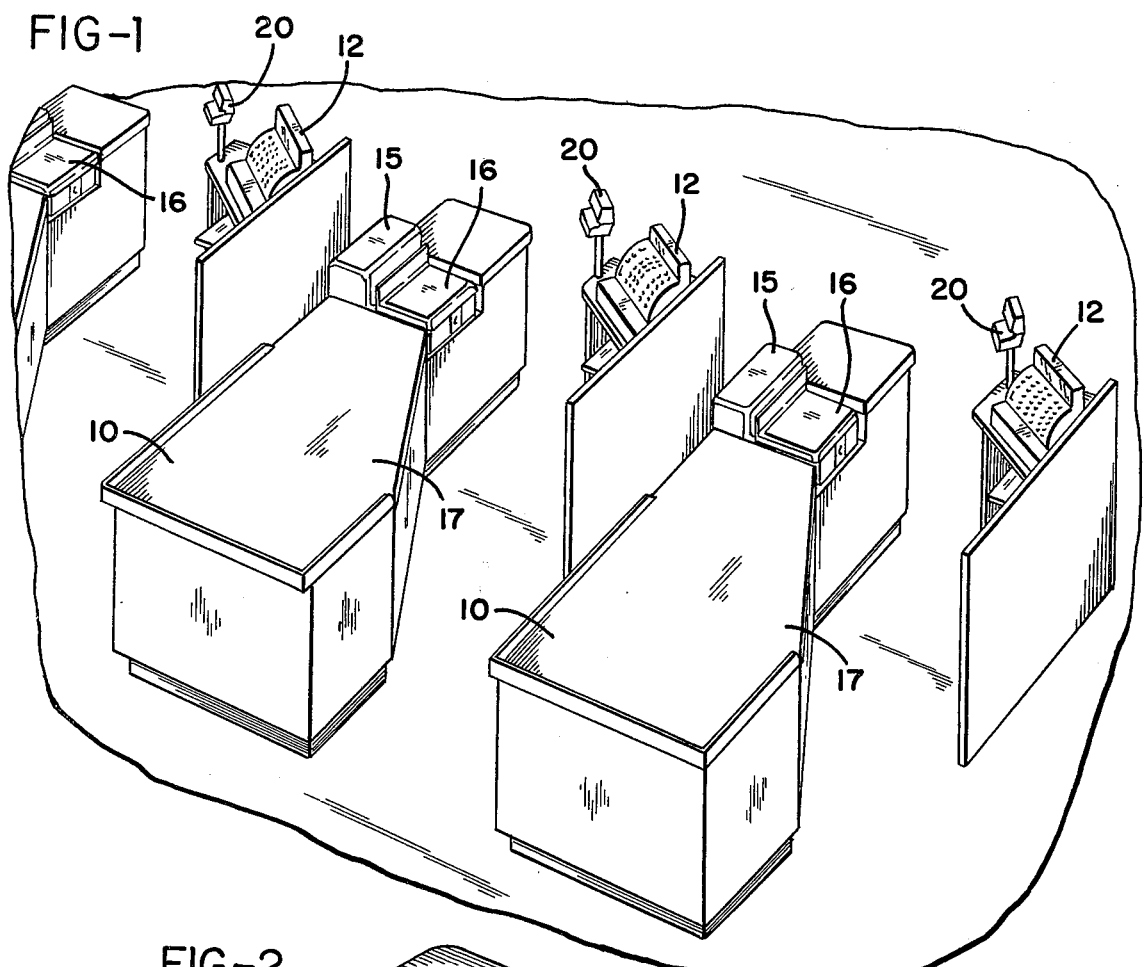
FIG. 1 is a pictorial view of a grocery checkout area showing checkout counters, scales, cash registers, and keyboard units.

Referring now to the drawings which show a preferred embodiment of the invention, and particularly to FIG. 1, a grocery checkout area is shown as including checkout counters 10, cash registers 12 and scales 15. Preferably, the scales are mounted in the checkout counter 10 with the top surface of the platter 16 generally flush with the counter surface 17. A keyboard/display unit 20 is associated with each checkout counter and may be mounted adjacent the cash register, as shown in FIG. 1, for viewing by both the clerk and the customer.

Figure 2:
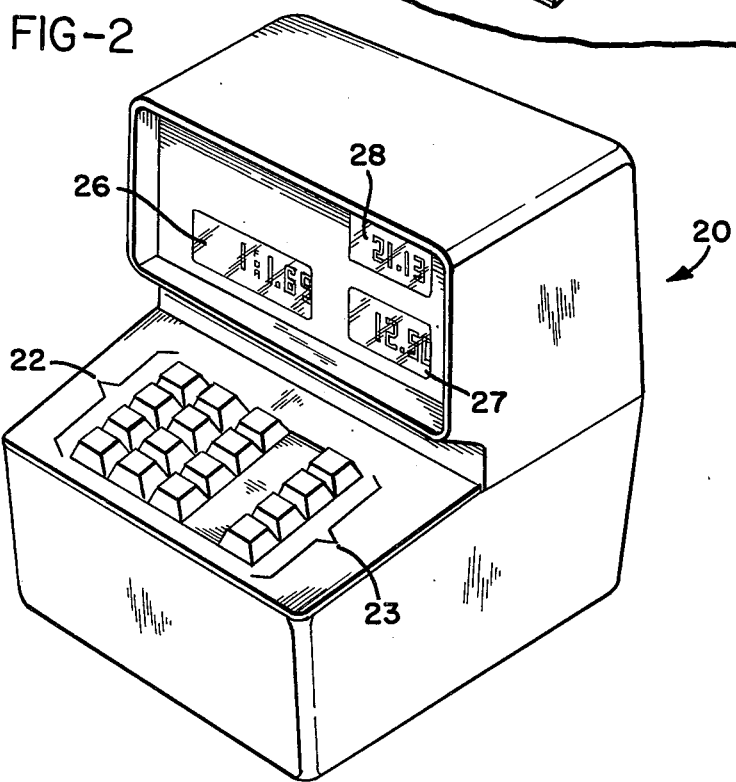
FIG. 2 is a perspective view of a keyboard/display unit.

The keyboard/display unit 20 is shown in greater detail in FIG. 2 and includes a twelve-key keyboard 22 used by the clerk to enter the price per unit weight of the commodity being purchased and a multiple or fractional number, if different from 1, to which the price per unit weight information is related. The keyboard unit also includes four function keys, shown generally at 23.

Each keyboard unit may contain a computing section to multiply the price per unit weight by the weight of the object on the scale platter, and to cause this information to be displayed visually. It is also contemplated that a single computing section be included in one keyboard/display unit and connected to serve a plurality of checkout stations. The price per unit weight information is displayed on an electro-optic display 26, the weight information is displayed at 27, and the total price information is displayed at 28.

Since the scales 15 and the keyboard/display units 20 are housed separately and are joined by cables, and since the computer may also be located at a separate location, such as in one of the keyboard/display units, and is joined to the other stations by cables, it is desirable that the number of wires within each cable be held to a minimum. To accomplish this, the weight information from the scale 15 is converted into binary coded decimal (BCD) form and is transferred in a serial manner to the keyboard/display unit. Similarly, where the computer is separate from the keyboard/display unit, the weight and price per unit weight is transferred in serial form to the computer section, and total price information from the computer is similarly transferred in serial form to the display unit. It has been found that a shielded, four-wire cable, or two shielded, two-wire cables, can transfer all of the required information among the scale, keyboard/display unit and computer.

Referring now to FIG. 3 which is a simplified block diagram of the system, a scale 15 includes an optical chart (not shown) which is moved in accordance with the weight of the object placed on scale platter 16. This optical chart and the means for optically reading weight information are described in more detail in U.S. Pat. Nos. 3,439,760 and 3,557,353. The weight information is converted from a gray scale, biquinary code on the chart into a binary coded decimal form equivalent of weight by chart electronics circuit 17, and upon appropriate command signals from the scale logic 18, this information is periodically transferred on line 35 to an input register 40 in the keyboard/display unit 20. Both the chart electronics 17 and the scale logic 18 are controlled by scale clock 19.

This weight information is subsequently transferred to a memory 45 and displayed on the electro-optic display 27.

A motion detector 50 senses when the scale platter is in motion, and if motion is indicated, the weight display and the price computation and the total price display 28 are inhibited. The price per unit weight information from the keyboard 22 is stored in a memory 55 and displayed on the electro-optic display device 26. A computer, shown generally at 60, receives the weight and price per unit weight information from an interface logic circuit 62 on cable 65, computes total price, and then transmits the total price information on the same cable 65 to the innerface logic 62 where this information is stored in memory 67 and displayed on the electro-optic display device 28. The computer includes a calculator circuit 68 which operates under control of a program 69.

Motion of the scale platter is sensed by observing the direction of change in the value of the number temporarily stored in the input register 40. Initially, when an object is first placed on the scale platter, the platter will move fairly quickly to a balance position, and during transition, the BCD code in the input register 40 will change rapidly. As the platter approaches a balance condition, the BCD code will change more slowly. Usually, the scale platter will initially overshoot and oscillate about the rest position slightly. Therefore, even at the rest position, the BCD code or number supplied to the input register 40 might be increasing and decreasing slightly.

The initial motion of the scale will create a motion signal. The optical chart will thereafter move so rapidly that the movement of the optical marks, especially those representing the least significant digits, past the photodetectors exceeds the ability of the photodetectors to transition from one state to the other, and therefore it may appear to these photodetectors that the scale platter is not in motion. In this invention, the computation sequence is delayed for a period of time, typically one-half second following initial motion, to permit the scale platter at least to approach its rest position before a computation is begun and the computed value displayed.

To detect motion in this invention, the weight information just entered into the input register 40 is compared with the weight information previously stored in the memory 45. A difference in these numbers indicates motion, and two successive changes in the same direction will cause a motion signal to be generated.

Referring now to FIG. 4, which is a block diagram of the motion detector circuit constructed in accordance with the teachings of this invention, the weight information from the scale on line 35 is sent into the input register serially under the control of a clock pulse from the scale on line 35a. A load pulse is generated by the scale on line 35b at the completion of each cycle to enter the weight information into the memory 45.

Immediately prior to entering the weight information into the memory, the weight in the register 40 is compared with the previous weight information in the memory 45 by a coincidence detector 75 which provides an output on one of three lines to indicate whether the weight in the register 40 is greater than (>), equal to (=), or less than (<) the weight stored in the memory 45.

The output of the coincidence detector 75 is applied to a direction sensing circuit 80 which retains the indication of the direction of change in the BCD number from the scale.

A motion detector 85 provides an output on line 86 whenever two successive weight change signals in the same direction are detected. This is true even though the two weight change signals in the direction may be separated by several "equal to" outputs. The input to the shift register 40 is clocked in at a rate faster than the normal movement of the optical chart within the scale, and therefore several identical weight indications will be generated, even while the scale is in motion, due to the fast repetition rate of the clock 19. This is true even though the least significant number in the BCD code is used for motion detection.

Reference is now made to FIGS. 5A and 5B which together form an electrical schematic diagram of the motion detector system. The input shift register 40 includes two eight bit shift registers 40a and 40b connected in series to receive a four digit BCD code representing weight, each digit including four binary bits. In the embodiment shown, the shift registers are type SN74164 registers. The input S1 of shift register 40a receives data in serial form on line 35 from the scale 15 under the direction of clock pulses on line 35a, which are applied to the clock (CL) input of both shift registers.

The outputs QA-QH and QA'-QH' of the shift registers 40a and 40b, respectively, are connected directly to the inputs of the memory 45. In the preferred embodiment of this invention, the memory 45 includes four memory and display devices 45a–45d, each a TIL 309 Latch Register, Decode and Display Device manufactured by Texas Instruments, and each device stores and displays one digit of the weight value.

The information from the shift register 40 is not transferred into the memory 45 until after the receipt of the load signal on line 35b from the scale. This load signal occurs only after the digital word representing weight has been fed into the shift register 40 and is available on output QA-QH'.

The load pulse is also applied to a monostable multivibrator MV1, the output ($\overline{Q}$) of which is applied to the "load" (L) inputs of each of the latch registers 45a–45d.

The least significant digit in the shift register 40 is compared with the previously recorded digit in the latch register 45a by means of a four bit binary comparator device 75. This device is manufactured by Texas Instruments under the designation SN 7485 and has three outputs 91, 92 and 93 representing "greater than", "equal to", or "less than", respectively.

The output of the comparator 75 is applied to the direction sensing circuit 80 which includes two JK flip-flops FF1 and FF2 and an AND gate 95.

The outputs of flip-flops FF1, FF2 and AND gate 95 are applied to the motion sensor circuit 85. This circuit includes "D"-type flip-flops FF3 and FF4, AND gates 96 and 97, and inverter 98.

Flip-flops FF1 and FF2 in the direction sensing circuit are type SN 74107 dual J-K Master-Slave flip-flops, manufactured by Texas Instruments. The status of the output of these flip-flops is not finally determined until the trailing edge of the load pulse 35c is applied thereto through inverter 113, that is, when the signal transitions from a high to a low state.

Flip-flops FF3 and FF4 are type SN 7474 dual D-type edge-triggered flip-flops manufactured by Texas Instruments. Input information to the flip-flops is transferred to the respective output at the trailing edge of the load pulse on line 35b, that is, when the load pulse transitions from a low to a high.

Flip-flops FF3 and FF4 are reset at the leading edge of the load pulse whenever the comparator 75 generates to an "equal to" output on line 92. This is the result of the "equal to" output on line 92 and the load pulse 35c through AND gate 95 and inverter 98 to the clear (C) inputs of flip-flops FF3 and FF4.

The outputs of flip-flops FF3 and FF4 are applied to a second monostable vibrator MV2, the output of which on line 86 inhibits computation by the computer and prevents the value to be displayed until at least one-half second has elapsed after the "equal to" indication on line 92 is generated and maintained.

Multivibrator MV2 is a type SN 74123 retriggerable monostable multivibrator manufactured by Texas Instruments. In the present invention, resistor R1 and capacitor C1 cause the output of the multivibrator (Q) to remain high for one-half second after the application of a trigger pulse, and this time may be lengthened by retriggering during the interval that the outlet is high.'

The motion detector will provide an output to cause the value display to be blanked and to prevent computation from occurring whenever the comparator provides two greater than or two less than indications, even though these indications are separated by several equal to signals. The speed of operation of the electronic portion of the circuit is such that several identical weight indications and therefore a corresponding number of equal to outputs from the comparator will exist, even though the scale platform is in motion.

An out of range circuit is also provided which senses when the scale is outside predetermined limits, i.e., below zero or over 25 pounds. This circuit includes flip-flop FF5 having an input connected to the QH' output of shift register 45b and an output connected to the blanking inputs (BL) of the memory and display devices 45a–45d.

Each memory 45a–45d is a type TIL 309 Numeric Display with Logic device manufactured by Texas Instruments. These devices include internally driven seven segment light emitting diode (LED) displays each containing a 4-bit latch and a decoder/LED driver in a single package.

Reference is now made to FIG. 6 which, in combination with FIG. 5, will be used to describe the operation of the motion detector circuit.

Several time intervals are presented in graphic form in FIG. 6: interval $I_1$ represents the first interval, and it is assumed for purposes of explanation that the scale platform is moving downwardly, thus showing an increase in weight; interval $I_2-I_n$ represents all intervals wherein several load pulses have been received but wherein no indication of weight change is noted because the load pulses occur more frequently than the weight code changes on the optical disc as it continues to rotate; interval $I_n+1$ represents the interval wherein the shift register indicates an increase in weight caused by a change in the weight code; and interval $I_n+2$ represents the next interval which normally will not indicate a weight change, again due to the speed at which the electronic portion of the circuit operates.

After the weight information is fed in serial form into the shift registers 40a and 40b, a load pulse on line 35b is generated, and this pulse is applied to monostable multivibrator MV1, flip-flop FF5, the direction sensing circuit 80, and the motion detector 85.

Following the leading edge of the load pulse, time $T_0$ in interval $I_n$, the comparator circuit 90 will have assumed one of three states, and in the example shown in FIG. 6, the comparator 75 will provide an output (a high) on line 91 indicating greater than. Line 91 is connected to the J input of FF1 and the K input of FF2.

The trailing edge of the load pulse causes the multivibrator MV1 to change state momentarily and to generate what will be referred to hereinafter as a delayed load pulse. The delayed load pulse is on line 105 and is applied to the load inputs (L) of the latch registers 45a–45d to cause these registers to accept and store the information then stored in the shift registers 40a and 40b.

Just after the trailing edge of the load pulse at time $T_1$, the delayed load pulse on line 105 will cause the latch register or memory 45 to assume the same value as the shift register, and therefore the comparator output will thereafter provide a high on the equal to output, line 92.

The trailing edge of the load pulse provides a trigger signal for flip-flops FF1 and FF2 in the direction sensing circuit 80. Since a greater than indication is present on line 91, flip-flop FF1 will change state and provide a logic high output on line 110 and AND gate 96; flip-flop FF2 will provide a logic low output on line 112 to AND gate 97.

It is assumed that flip-flops FF3 and FF4 are in the reset state, and neither flip-flop will change state at this time (T1) even though a logic high appears on line 91 to gate 96, and line 110 is also a logic high following the transition in state of flip-flop FF1 since line 110 goes high slightly after the completion of the load pulse to the trigger (T) input of flip-flop FF3.

Since only one motion signal in the greater than direction has been sensed, a motion signal is not generated at this time.

In the several intervals represented by interval $I_2-I_n$, it is assumed that the BCD number provided by the scale to the shift register 40 does not change, and therefore the BCD number in the shift register 40 will be identical to the BCD number previously stored in memory 45. Accordingly, during the load pulse on line 35b at time T2, the comparator 90 will provide a logic low on line 91, a logic high on line 92 and a logic low on line 93.

Flip-flop FF1 will continue to provide a logic high from its Q output on line 110, and flip-flop FF2 will continue to provide a logic low from its Q output on line 112. Flip-flop FF3 will provide a logic high on its Q output in line 115, and flip-flop FF4 will provide a logic low on its Q output on line 116.

During the load pulse, at time T2, AND gate 95 will be provided with a logic high on both of its inputs, one from the load pulse, the other from the equal to output on line 92 from the comparator, and this will cause flip-flops FF3 and FF4 both to reset, if they had been previously activated.

During the interval $I_{n+1}$, it is assumed that the BCD number entered into the shift register 40 again increases, and therefore the output from comparator 75 will change, i.e., a logic high will again appear on line 91 during the load pulse from time T4 to T5.

Since gate 96 now has a logic high on both of its inputs (line 91 from the comparator and line 110 from flip-flop FF1), flip-flop FF3 will change state at the trailing edge of the load pulse 35b (Time T5). Its output on line 115 will then transition at time T4 from a logic high to a logic low.

To trigger multivibrator MV2 the A input must be at a logic low, and the B input must transition from a logic low to a logic high, or, the B input must be a logic high, and the A output transition from a logic high to a logic low. Since this condition is not now met, multivibrator MV2 is not triggered at this time.

In time interval $I_{n+2}$, another equal to signal is generated by the output on line 92 from comparator 75 during the load pulse, and this will cause flip-flop FF3 to be reset. Its output on line 115 will transition from low to high and at this time, multivibrator MV2 will trigger and provide a motion signal output on line 86. This output will remain until the time period established by C1-R1 expires.

Should another greater than output from the comparator occur, a motion signal will again be generated, flip-flop FF3 will again change state and retrigger the multivibrator MV2. This retriggering of the multivibrator will occur regardless of how much time elapses between the greater than outputs from the comparator. If the multivibrator MV2 is generating a motion signal when the successive greater than signals are generated, then the multivibrator will be retriggered and the time delay started anew.

For less than outputs from the comparator 75, the operation will be similar and will involve flip-flop FF2 in the direction sensor 80 and flip-flop FF4 in the motion sensor.

Thus, the first change in value between the number stored in the memory 45 and the number in the shift register 40 will cause either flop-flop FF1 or FF2 to remember that change and its direction; any successive change in the same direction will cause either flip-flop FF3 or FF4 to be energized and to trigger the multivibrator MV2.

On the other hand, if the changes are in alternate directions, such as might occur while the platform is at rest, but oscillating slowly about its balance position, then flip-flop FF1 and FF2 will be alternately triggered, but no motion signal will be generated.

It may be noted that once a motion signal is generated, a number of equal to outputs will be generated before the output of the multivibrator MV2 again indicates no motion. Therefore, multivibrator MV2 may be replaced with a counter to count a predetermined number of load pulses during the time when only an equal to output from the comparator is generated, and to reset when that number is reached.

In the preferred embodiment of the invention, the least significant bits of weight are sensed. Of course, the entire weight number could be compared through the use of additional circuitry. It is preferred that any weight change be noted, and in the preferred embodiment, two successive weight changes in the same direction will result in a motion signal; however, the direction sensor 80 and the motion sensor 85 may be modified to provide for a motion signal to be generated only whenever there are three, four or more successive weight changes in the same direction.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. A method of detecting motion of a weighing scale platform including the steps of
   periodically generating electric signals representing weight,
   transferring said weight signals to a memory during each period,
   comparing said incoming weight signals with that stored in said memory prior to transfer of said weight signals, and
   generating a motion signal whenever there are two or more successive weight changes in the same direction.

2. The method of claim 1 further including the steps of
   temporarily storing said weight signals in a temporary storage means prior to transfer into said memory, and wherein said weight signal in said temporary storage means and said memory are compared periodically.

3. Motion detector for use with electronic weighing scales including
   means for periodically generating electrical signals representing weight,
   memory means for storing said weight signals,
   means for comparing said weight signals from said scale with those previously recorded in said memory means, and
   means responsive to said comparing means for generating a motion signal whenever there are two or more successive weight changes in the same direction.

4. The motion detector of claim 4 further including
   means for temporarily storing said weight signals from said weighing scale, and
   means for transferring said weight signals from said temporary storage means to said memory means, and
   wherein said comparing means compares the weight signals in said temporary storage means with those previously recorded in the memory means prior to transfer thereof.

5. Motion detector for use with electronic weighing scales including
   means for periodically generating electrical signals representing weight,
   memory means for storing said weight signals,
   means for comparing said weight signals from said scale with those previously recorded in said memory means, said comparing means having at least two outputs, one representing an increase in weight, the other representing a decrease in weight, and
   means responsive to said comparing means for generating a motion signal whenever there are two or more successive weight changes in the same direction including
   direction sensing means connected to the output of said comparator for remembering the direction of the last weight change, and
   motion sensing means connected to said comparator and said direction sensing means for providing an output whenever there are two or more successive weight changes in the same direction.

6. The motion detector of claim 6 further including a retriggerable multivibrator connected to said motion sensing means for generating a motion signal of predetermined duration each time there are two successive weight changes in the same direction.

7. Motion detector for use with electronic weighing scales including
   means for periodically generating electrical signals representing weight,
   memory means for storing said weight signals,
   means for comparing said weight signals from said scale with those previously recorded in said memory means including
   a comparator device connected between said memory means and said incoming weight signals, said comparator providing greater than and less than output signals, and
   means responsive to said comparing means for generating a motion signal whenever there are at least two successive weight changes in the same direction including
   first and second flip-flops having their inputs connected to said greater than and less than outputs of said comparing means for recording the first occurrence of a weight change and the direction thereof,
   third and fourth flip-flops having inputs connected to said first and second flip-flops, respectively, and the greater than and less than outputs of said comparator means, respectively,
   said third or fourth flip-flops being actuated whenever two successive weight changes in the same direction occur, and
   a retriggerable multivibrator connected to the outputs of said third and fourth flip-flops for generating a motion signal of a predetermined duration whenever either said third or fourth flip-flop is actuated, and
   means connected to the equal to output of said comparing means for resetting said third and fourth flip-flops.

8. Motion detector for use with electronic weighing scales including
   means for periodically generating electrical signals representing weight, and a load signal,
   means for temporarily storing said weight signals from said weighing scale, memory means for storing said weight signals, means for transferring said weight signals from said temporary storage means to said memory means upon receipt of said load signal;

means for comparing said weight signals in said temporary storage means with those previously recorded in said memory means prior to the transfer of new weight signals thereinto, said comparing means providing greater than, equal to and less than output signals, means responsive to said comparing means for generating a motion signal whenever there are more successive weight changes in the same direction including first and second flip-flops having their inputs connected to said greater than and less than outputs of said comparing means for recording the first occurrence of a weight change and the direction thereof, third and fourth flip-flops having inputs connected to said first and second flip-flops, respectively, and the greater than and less than outputs of said comparator means, respectively, said third or fourth flip-flops being actuated whenever two successive weight changes in the same direction occur, a retriggerable multivibrator connected to the outputs of said third and fourth flip-flops for generating a motion signal of a predetermined duration whenever either said third or fourth flip-flop is actuated, and means connected to the equal to output of said comparing means for resetting said third and fourth flip-flops.

9. A method of detecting motion of a weighing scale platform including the steps of periodically generating electrical signals representing the weight of an object placed on said platform, transferring periodically said weight signals into a memory, comparing said incoming weight signals with that stored in said memory immediately prior to transfer of said weight signals thereinto, and generating output signals representing an increase in weight and a decrease in weight, storing the output signal representing the direction of the last weight change, and generating a motion signal whenever there are at least two successive weight changes in the same direction.

10. The method of claim 8 wherein said electrical signals representing weight are stored and compared in digital form.

* * * * *